US006768645B2

(12) United States Patent
Kadonaga

(10) Patent No.: US 6,768,645 B2
(45) Date of Patent: Jul. 27, 2004

(54) IC CARD AND IC-CARD ADAPTOR

(75) Inventor: Akira Kadonaga, Kanagawa (JP)

(73) Assignee: Sony Corporation (JP)

( * ) Notice: Subject to any disclaimer, the term of this patent is extended or adjusted under 35 U.S.C. 154(b) by 11 days.

(21) Appl. No.: 10/239,253

(22) PCT Filed: Jan. 25, 2002

(86) PCT No.: PCT/JP02/00570
§ 371 (c)(1),
(2), (4) Date: Mar. 3, 2003

(87) PCT Pub. No.: WO02/059831
PCT Pub. Date: Aug. 1, 2002

(65) Prior Publication Data
US 2003/0161115 A1 Aug. 28, 2003

(30) Foreign Application Priority Data
Jan. 26, 2001 (JP) .................................. P2001-019093
Mar. 9, 2001 (JP) .................................. P2001-067461

(51) Int. Cl.$^7$ ......................... H05K 5/02; G06K 19/063
(52) U.S. Cl. ...................................... 361/737; 235/492
(58) Field of Search ............................... 361/720, 752, 361/741, 748, 760, 759, 756, 737, 726–728, 736, 742, 743; 235/492

(56) References Cited
U.S. PATENT DOCUMENTS 6,109,939 A * 8/2000 Kondo et al. ............... 439/140
6,199,756 B1 * 3/2001 Kondo et al. ............... 235/380
6,272,017 B1 * 8/2001 Klatt et al. .................. 361/737
6,341,728 B1 * 1/2002 Kondo et al. ............... 235/487
D457,887 S * 5/2002 Kadonaga .................. D14/436
D458,610 S * 6/2002 Kadonaga .................. D14/474
6,593,167 B2 * 7/2003 Dobashi et al. ............. 438/107

FOREIGN PATENT DOCUMENTS

| JP | 1-288490 A1 | 11/1989 |
| JP | 5-43374 U | 6/1993 |
| JP | 7-23574 U | 5/1995 |
| JP | 2000-40131 A1 | 2/2000 |
| JP | 2000-323855 A1 | 11/2000 |
| JP | 2001-5943 A1 | 1/2001 |

* cited by examiner

Primary Examiner—David Martin
Assistant Examiner—Dameon E. Levi
(74) Attorney, Agent, or Firm—Lerner, David, Littenberg, Krumholz & Mentlik, LLP

(57) ABSTRACT

An IC card (10) incorporating a semiconductor memory. The IC card comprises a substantially rectangular card body (11), a terminal section (12) provided at the distal end of the card body (11), which is to be first inserted into an apparatus, and an identification recess made in a proximal end of the card body (11), which is opposite to the distal end. The user can determine the specification of the IC card by touching the identification recess (25) with the finger.

39 Claims, 12 Drawing Sheets

IC CARD AND IC-CARD ADAPTOR

TECHNICAL FIELD

This invention relates to an IC card which can store data and which can be used as an extension module of a recording/reproducing apparatus provided in a host system. The invention relates to an IC-card adapter apparatus that can connect an IC card of new type to apparatuses designed to hold the IC cards of the existing type.

BACKGROUND ART

IC cards are known, each shaped like a plate and incorporating a semiconductor memory used as a recording medium. They are used as external storage devices in data-processing apparatuses and in the recording/reproducing apparatuses incorporated in personal computers and digital still cameras. Of the IC cards known, some are designed for various uses, though they are identical in shape. Of these IC cards having the same shape, some are designed to store image data acquired by digital still cameras or the like, and some others are designed to store music data, thus managing copyright. The IC cards are painted in different colors in accordance with the types of data they store.

For visually handicapped persons, however, it is difficult to identify IC cards of the same shape, one from another, though they are painted in different colors in accordance with the types of data they store. The visually handicapped person may insert an IC card into a slot of a wrong recording/reproducing apparatus that cannot write or read data into or from the IC card.

Some of the IC cards have a distal end and a proximal end, which are different in shape. Hence, the user can tell in which orientation the IC cards should be inserted into recording/reproducing apparatuses. However, there have been provided no IC cards that visually handicapped people can tell which side is front or back. Such people may therefore insert the IC card in the wrong orientation.

Among IC cards used as external storage devices of recording/reproducing apparatuses incorporated in personal computers, digital still cameras and the like are so-called "small IC cards." The small IC cards are identical to the other IC cards in electrical specification, but are different in shape. Different from the other IC cards in physical specification, the small IC cards cannot be held in the apparatuses designed to hold the IC cards of the existing type.

DISCLOSURE OF THE INVENTION

An object of the present invention is to provide an IC card that differs in shape from the conventional IC cards so that the user can easily distinguish it by the touch from any other, in terms of type and use, without looking at it. Another object of this invention is to provide an IC card whose distal and proximal ends differ in shape so that the user can tell, by touching it or without looking at it, its orientation with respect to the apparatus into which it is being inserted.

Still another object of the invention is to provide an IC card that has identification notches and various depressions made in the back so that the user can distinguish, by the touch, not only which orientation the IC card assumes with respect to the apparatus into which it is being inserted, but also which side of the IC card is the front or the back.

Another object of the present invention is to provide an IC card that efficiently incorporates components, such as semiconductor memories, and can therefore be made smaller than the conventional IC cards.

Another object of the invention is to provide an IC card that is small and can yet have a great storage capacity.

A further object of the present invention is to provide an IC card that comprises a recording-error preventing mechanism easy to operate and free of malfunction.

Another object of the invention is to provide a novel IC-card adapter apparatus that can connect IC cards of various physical specifications to apparatuses designed to hold the IC cards of the existing type.

Still another object of the invention is to provide an IC-card adapter apparatus that can prevent erroneous insertion of IC cards.

A further object of the present invention is to provide an IC-card adapter apparatus that prevents any IC card from being damaged when the IC card is being inserted into or removed from a recording/reproducing apparatuses.

To achieve the objects described above, an IC card according to the present invention comprises: a substantially rectangular card body incorporating at least a semiconductor memory; a terminal section provided at an distal end of the card body and configured to be electrically connected to a host apparatus; and an identification recess made in a proximal end of the card body, which opposes the distal end. The identification recess is positioned one-sidedly on either side from the center of the width direction perpendicular to the insertion direction to the card body.

The identification recess made in the card body enables the user to identify the type of the IC card and determine in which is the distal end that should be inserted first into a recording/reproducing apparatus. Use jointly with a chamfered section and another recess or other recesses closed at the top of the card body and opening at the bottom and sides of the card body, the identification recess help the user to determine the orientation of the IC card. For example, the user can determine which side of the IC card is up when he or she inserts the card into the apparatus, by touching the identification recess and a chamfered section and other recesses. The chamfered section is provided at a corner of the distal end of the card body, at which the identification recess is provided. The other recesses include those protecting electrodes, an insertion-error preventing groove made in the bottom of the card body and at one corner of the distal end, a recess made in the bottom of the card body and located near the distal end thereof, and a recess for achieving ejection of the IC card, made in the bottom of the card body and located at the proximal end of the card body.

According to the invention there is provided an IC card comprising a substantially rectangular card body having, at a distal end, a terminal section provided and configured to be electrically connected to a host apparatus; a semiconductor memory incorporated in the card boy; a control circuit incorporated in the card body, for controlling the semiconductor memory; and a recording-error preventing mechanism for controlling data-recording into the semiconductor memory. In this IC card, the control circuit is located near the terminal section, the semiconductor memory and control circuit are juxtaposed in a direction in which the IC card is inserted into the host apparatus. The recording-error preventing mechanism is provided in a bottom of the card, lies between the control circuit and one side of the card body and has a switch member which is movable in parallel to the direction in which the IC card is inserted into the host apparatus.

Since the control circuit and the recording-error preventing mechanism are arranged close to each other, the lines connecting them can be short. This helps to render the card body small and provide a large space for accommodating the semiconductor memory. Additionally, the space in the card body serves to increase the space for the semiconductor memory. This is because the control circuit and the semiconductor memory are juxtaposed in the direction of inserting the IC card to the apparatus and the recording-error preventing mechanism is so arranged that the switch member moves parallel to the direction of inserting the IC card into the apparatus.

Further, the present invention provides another type of an IC card. This IC card comprises: a substantially rectangular card body having, at a distal end, a terminal section provided and configured to be electrically connected to a host apparatus; a semiconductor memory incorporated in the card boy; and a recording-error preventing mechanism for controlling data-recording into the semiconductor memory. The recording-error preventing mechanism has a switch member provided in a hole made in one surface of the card body and configured to move to allow and inhibit data-writing into the semiconductor memory. The switch member having notches in two sides that oppose in a direction in which the switch member moves, each notch designed to receive a jig for moving the switch member.

Since the switch member moves in a hole made in one surface of the card body, its motion is restricted, making it possible to hold the IC card in the operation mode set. Further the switch member such a height as not to protrude from said hole. This helps to maintain the IC card in the operation mode, more reliably.

The present invention provides an IC-card adapter apparatus which can hold the IC card different in physical specification in the apparatus designed to hold the IC cards of the existing type. The IC-card adapter apparatus comprises: a main body configured to be held in an host apparatus; a card-holding section provided in the main body, for holding an IC card incorporating at least a semiconductor memory and having a first terminal section at one end; a second terminal section provided at a distal end of the main body, which is to be inserted first into the host apparatus, and configured to transmit and receive data to and from the host apparatus; an IC card slot made in a proximal end of the main body, opposite to the distal end, and communicating with the card-holding section; a connecting section provided in the card-holding section, electrically connected to the second terminal section and configured to be connected to the first terminal section of the IC card; a notch made in the proximal end of the main body, exposing a part of the IC card held in the card-holding section.

When an IC card is inserted into it, the IC-card adapter apparatus holds the whole IC card in the card-holding section. A part of the IC card held in the card-holding section is exposed through the notch in the proximal end of the main body.

The other objects of this invention and the other advantages of the invention will be more apparent from the following description of embodiments.

BEST MODE FOR CARRYING OUT THE INVENTION

An IC card according to the present invention will described with reference to the accompanying drawings.

Figure 1:
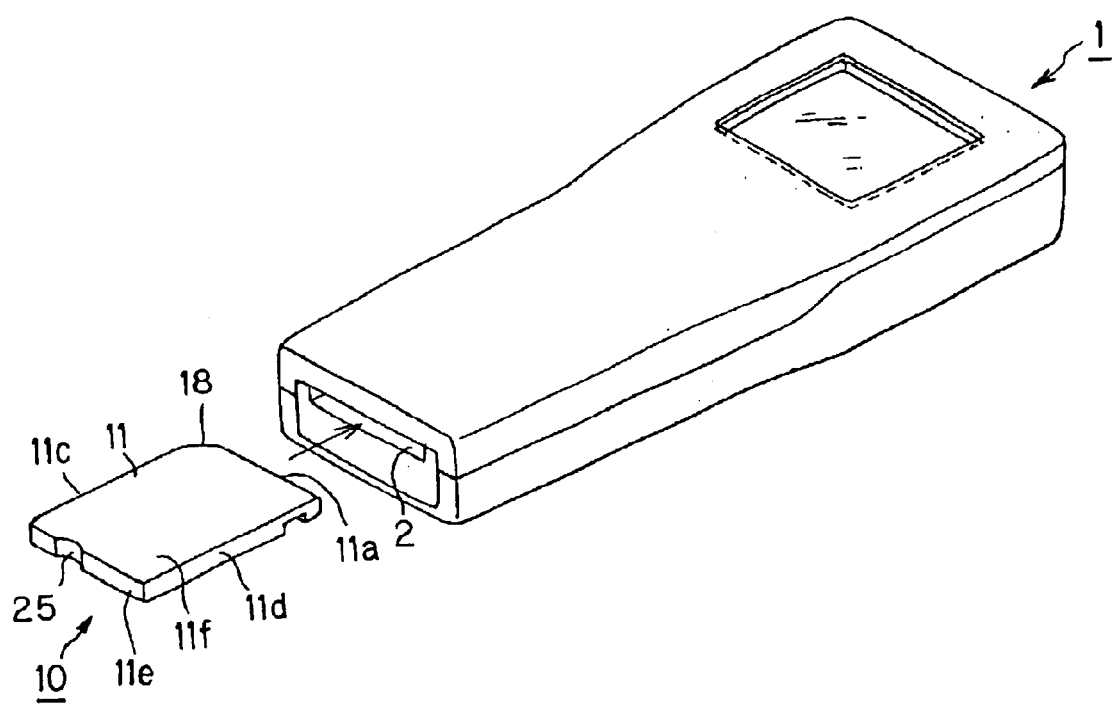
FIG. 1 is a perspective view showing an IC card according to this invention and a recording/reproducing apparatus that can hold the IC card.

The IC card 10 of this invention is designed for use as an external storage device in a recording/reproducing apparatus 1 that records and reproduce audio data and the like. As FIG. 1 shows, the IC card 10 may be inserted into the recording/reproducing apparatus 1 through the IC card slot 2 made in one end of the apparatus 1. The apparatus 1 can therefore record and reproduce audio data and the like in and from the IC card 10 held in it.

Figure 2:
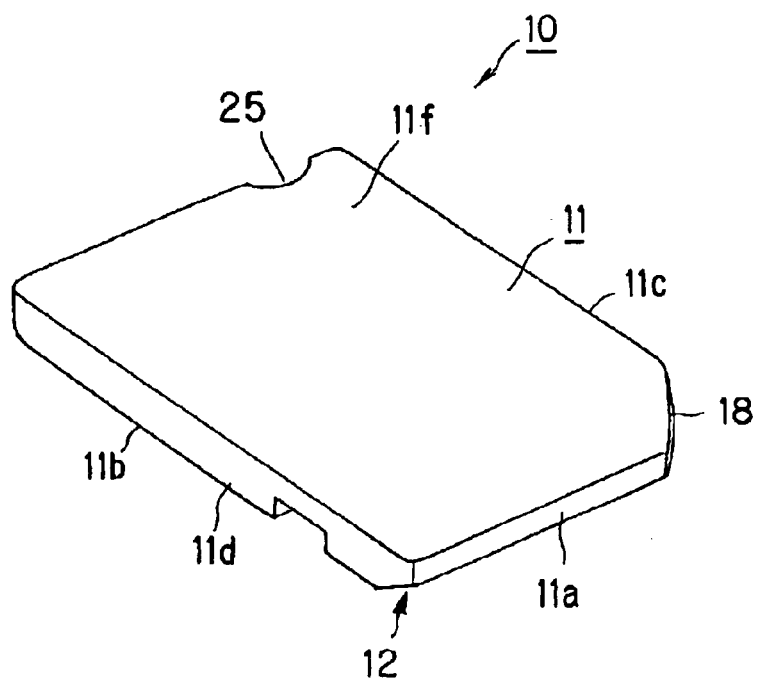
FIG. 2 is a perspective view of the IC card according to the invention, as looked at from above.
Figure 3:
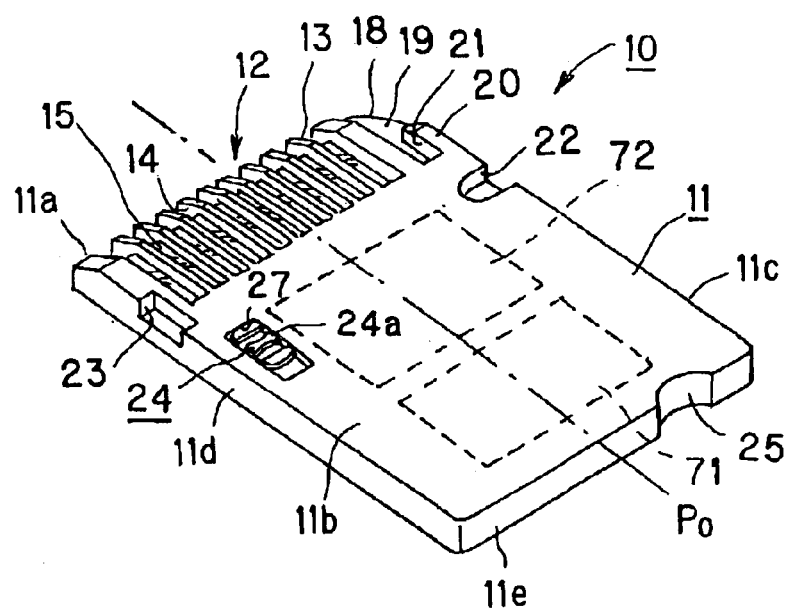
FIG. 3 is a perspective view of the IC card according to the invention, looked at from the bottom.

As FIGS. 2 and 3 show, the IC card 10 according to the present invention comprises a card body 11 that is substantially rectangular and a synthetic resin molding. As seen from FIG. 3, the card body 11 incorporates a semiconductor memory element 71, a control circuit element 72, and other semiconductor elements including a copyright protecting circuit element. The memory element 71 is, for example, a flash memory having a large storage capacity of 4 megabytes (hereinafter abbreviated as "MB"). The element 71 may have a storage capacity of 4 MB, 16 MB, 32 MB, 64 MB, 128 MB, or 256 MB. The control circuit element 72 controls the writing and reading of audio data and the like, into and from the semiconductor memory element 71.

The card body 11 incorporates not only semiconductor components, but also a printed circuit board that holds these semiconductor components. The card body 11 is mechanically so strong that it would not be bent in spite of the force it usually receive during the use of the IC card 10. Hence, the card body 11 protects the semiconductor components (including the memory element 71) and the printed circuit board holding the semiconductor components.

Figure 4:
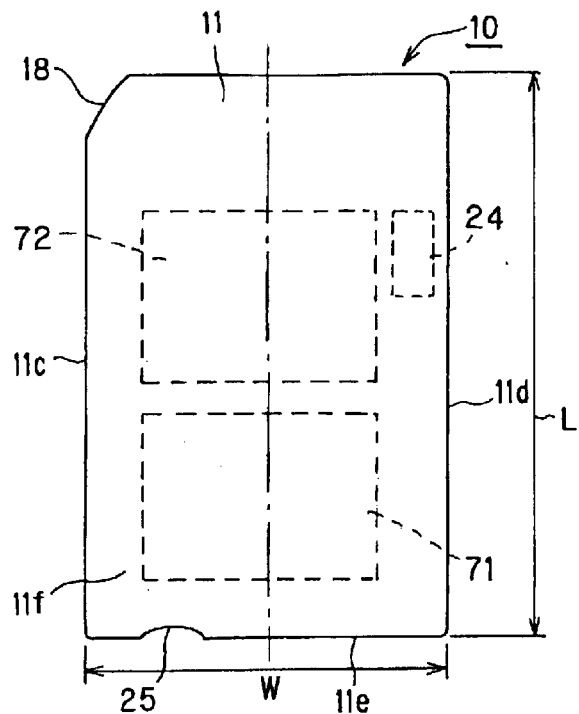
FIG. 4 is a plan view of the IC card according to the invention.
Figure 5:
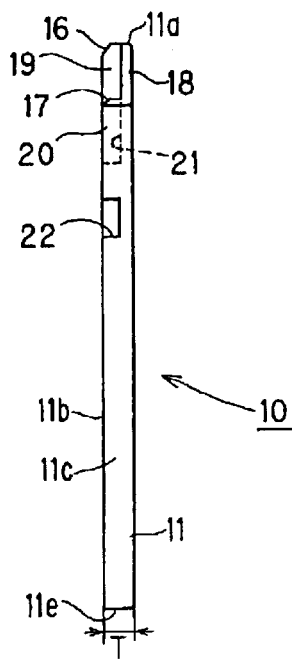
FIG. 5 is a left-side view of the IC card according to the present invention.

The IC card 10 of this invention is identical to the existing, standard IC cards in electrical specification, but is different in terms of physical specification. The IC card 10 is made smaller in shape than the standard IC cards. More precisely, the card body 11, which is a synthetic resin molding and which incorporates the semiconductor components such as the semiconductor memory element 71, is a substantially rectangular. As FIGS. 4 and 5 show, it has a width W of about 20.00 mm, a length L of about 31 mm, and a thickness T of about 1.6 mm.

Although the standard IC card is similar to the IC card 10 described above in respect of basic use, it differs in size. It is a substantially rectangular card, but has a width W of about 21.45 mm, a length L of about 50 mm and a thickness T of about 2.8 mm.

Figure 6:
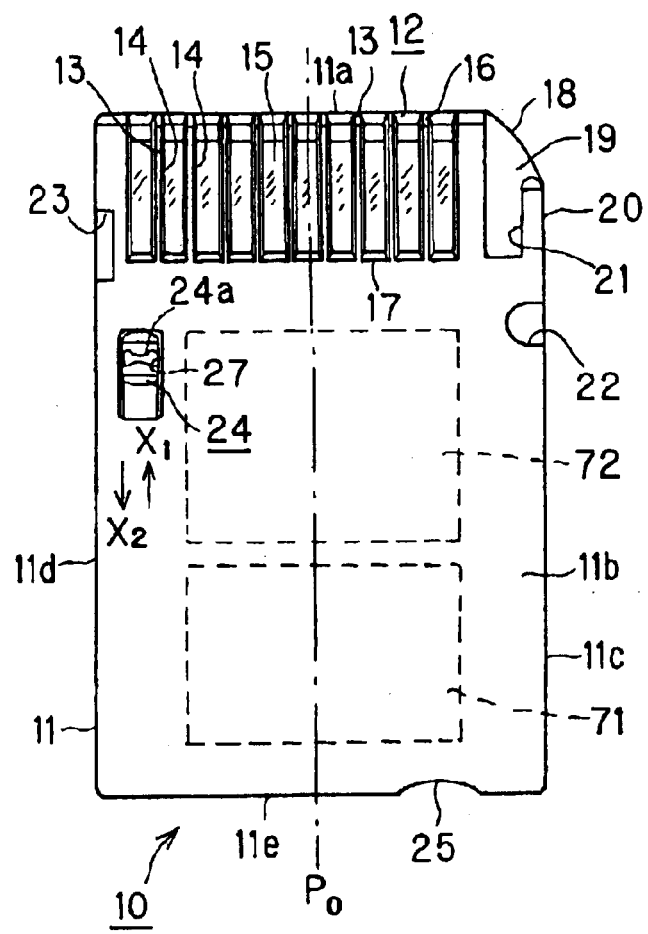
FIG. 6 is a bottom view of the IC card of this invention.
Figure 7:
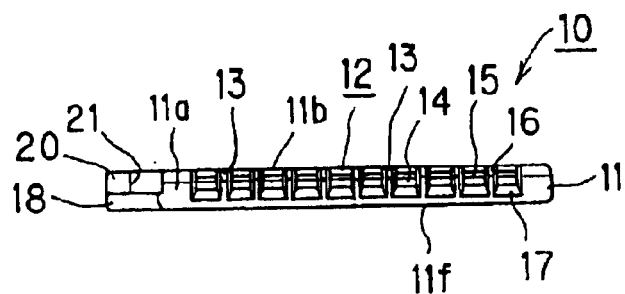
FIG. 7 is a front view of the IC card according to the invention.

As FIGS. 6 and 7 show, the card body 11 has a terminal section 12 at a shorter side. The terminal section 12 lies on the bottom 11b of the card body 11 and has its distal end exposed at the front edge 11a of the card body 11. The terminal section 12 has partitions 13, which define trenches 14 among them, and electrodes 15 laid in the trenches 14. The trenches 14 open at the front edge 11a and bottom 11b of the card body 11 so that they may hold the terminals provided in the recording/reproducing apparatus 1. The electrodes 15 lie on the bottoms of the trenches 14, respectively, and are isolated from one another by the partitions 13. Since the trenches 14 are narrower than the user's fingers, the user cannot touch the electrodes 15 laid on the bottoms of the trenches 14. Thus, the electrodes 15 are reliably protected from dirt, damage and the like, even while the user is holding the IC card 10.

The terminal section 12 of the IC card 10 has ten electrodes 15.

A serial interface transfers data between the IC card 10 and the recording/reproducing apparatus 1 through the electrodes 15 of the terminal section 12 while the apparatus 1 is holding the IC card 10. More specifically, the electrodes 15 function as, as least, an input terminal for a serial protocol bus-state signal BS, an input terminal for a serial protocol data signal SDIO, an input terminal for a serial clock signal SCLK and a power-supply voltage VCC terminal.

Figure 8:
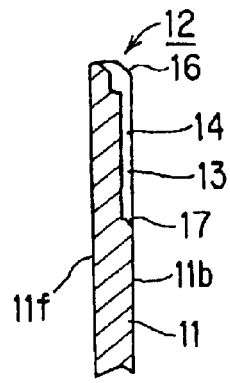
FIG. 8 is a sectional view of a part of the IC card, illustrating the terminal section of the provide at the distal end of the card body 11.

As FIG. 8 shows, the card body 11 has an inclined surface 16 at the front edge 11a and the opening of the trenches 14 defined by the partitions 13. The inclined surface 16 extends to the bottom of the 11b from a line on the front edge 11a, which is central with respect to the thickness of the card body 11. This surface 16 serves as an insertion guide when the user inserts the IC card 10 into the IC card slot 2 of the recording/reproducing apparatus 1. The card body 11 has another inclined surface 17 that rises from the bottoms of the trenches 14 to the bottom 11b of the card body 11. Over this inclined surface 17, the foreign materials, such as dust, on the electrodes 15 can be removed from the trenches 14 as the terminals provided in the IC card slot 2 scrape the foreign material.

As FIGS. 2, 3, 4 and 6 show, one corner of the front edge 11a of the card body 11, where the terminal section 12 is provided, is chamfered, defining a chamfered section 18. The chamfered section 18 helps the user to determine the orientation of the IC card 10 and to insert the IC card 10 in the correct direction into the recording/reproducing apparatus 1 or into an IC-card adapter apparatus 30 of this invention, which will be described later. The card body 11 has a recess 19 in the bottom 11b, at a position near the chamfered section 18. The recess 19 opens at the chamfered section 18 that extends from the front edge 11a to side 11c of the card body 11. The bottom of the recess 19 is, of course, at a level below the bottom 11b of the card body 11. The recess 19 defines a projection 20 that extends along the side 11c. The top of the projection 20 lies at substantially the same level as the bottom 11b of the card body 11. Located in the recess 19, the projection 20 defines an insertion-error preventing groove 21 that prevents the insertion of the IC card 10 into the recording/reproducing apparatus 1 through the IC card slot 2 thereof. When the IC card 10 is inserted into the IC card slot 2 in a correct position, the insertion-error preventing projection provided in the recording/reproducing apparatus 1 fits into the insertion-error preventing groove 21, allowing the IC card 10 to be inserted deeper into the recording/reproducing apparatus 1.

The IC card 10 according to this invention may not be inserted in the correct position into the recording/reproducing apparatus 1 via the IC card slot 2. In this case, the insertion-error preventing projection provided in the apparatus 1 abuts on the front edge 11a of the card body 11, at which the chamfered section 18, recess 19 and groove 21 are provided. When the insertion-error preventing projection abuts on the front edge 11a of the card body 11, it prevents the terminals provided in the apparatus 1 from contacting the electrodes 15 that lie in the trenches 14 defined by the partitions 13. Thus, the terminals of the apparatus 1 remains disconnected from the electrodes 15 of the IC card 10. The electrodes 15 and the semiconductor components such as the semiconductor memory element 71 are thereby protected.

As FIGS. 3, 5 and 6 depict, the card body 11 has a recess 22 in the bottom 11b, in the vicinity of the chamfered section 18 and the recess 19. The recess 22 serves to prevent the IC card 10 from slipping out of the card-holding section that is provided in the recording/reproducing apparatus 1 after the IC card 10 has been set into the card-holding section. This recess 22 opens at the bottom 11b of the card body 11 and at the side 11c of the card body 11, which is parallel to the direction in which the IC card 10 is inserted into the apparatus 1. The recess 22 receives a card-holding strip provided in the card-holding section of the apparatus 1, only when the IC card 10 is inserted in the correct position into the apparatus 1 through the IC card slot 2. The projection 20 that defines the insertion-error preventing groove 21 has one side flush with the side 11c of the card body 11, and the side 11c is substantially arcuate at the distal end of the card body 11. These structural features help the card-holding strip to slide smoothly onto the side 11c and then fit into the recess 22 when the IC card 10 is inserted into the card-holding section of the recording/reproducing apparatus 1.

Figure 9:
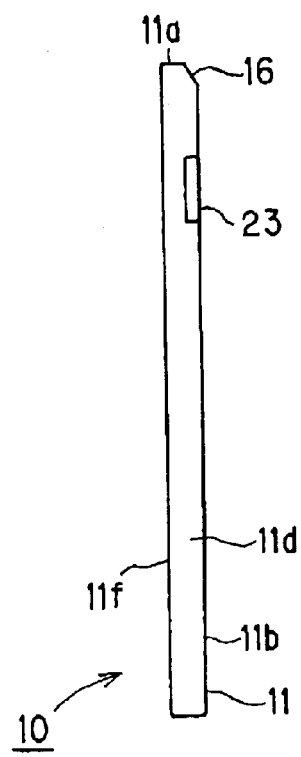
FIG. 9 is a right-side view of the IC card.

As seen from FIGS. 6 and 9, the card body 11 has a recess 23 in the bottom 11b in which the recess 19 is also cut at the chamfered section 18. The recess 23 is located near the front edge 11a of the card body 11. The recess 23 is provided to receive the card-ejecting mechanism that is incorporated in the card-holding section of the recording/reproducing apparatus 1. The recess 23 opens not only at the bottom 11b, but also at the side 11d that is parallel to the direction in which the IC card 10 is inserted into the apparatus 1. The recess 23 receives the card-ejecting mechanism provided in the card-holding section of the apparatus 1, only when the IC card 10 is inserted in the correct position into the apparatus 1 through the IC card slot 2.

As indicated above, the IC card 10 of this invention comprises the semiconductor memory element 71, the control circuit element 72, and the like, all contained in the card body 11. As FIGS. 4 and 6 show, the semiconductor memory element 71 and the control circuit element 72 are juxtaposed in the card insertion direction, with the control circuit element 72 positioned near the terminal section 12.

It should be noted that the semiconductor memory element 71 is a flash memory.

The IC card 10 of this invention comprises a recording-error preventing mechanism 24. The mechanism 24 is designed to prevent erroneous recording of data, such as audio data, into the memory element 71 provided in the card body 11. As shown in FIGS. 3 and 6, the recording-error preventing mechanism 24 is arranged in the bottom 11b of the card body 11 and positioned between the control circuit element 72 incorporated in the card body 11 and the side 11d of the card body 11.

The recording-error preventing mechanism 24 has a switch member 24a that is arranged in the opening 27 made in the bottom 11b of the card body 11. The switch member 24a can be moved in opposite directions of arrows $X_1$ and $X_2$, both being parallel to the direction in which the IC card 10 may be inserted into the apparatus 1. When moved, the switch member 24a switches the operating state of the IC card 10, between the recording state and the non-recording state. To be more specific, when moved in the direction of arrow $X_1$, the switch member 24a sets the IC card 10 into the recording state. When moved in the direction of arrow $X_2$, the switch member 24a sets the IC card into the non-recording state, preventing the recording of any data into the IC card 10.

The switch member 24a is positioned, not protruding from the bottom 11b of the card body 11 through the opening 27. Therefore, the switch member 24a would not impair the smooth insertion of the IC card 10 into the recording/reproducing apparatus 1.

Since the recording-error preventing mechanism 24 is arranged beside the control circuit element 72 and close thereto, the lines connecting the circuit 72 to the recording-error preventing mechanism 24 to supply the signal representing the operating state of the control circuit 72 can be short. The shorter the lines, the more reliably the signal can be supplied from the mechanism 24 to the control circuit 72. In addition, since the lines are short, the card body 11 can be smaller than otherwise. Moreover, the space accommodating the memory element 71 is relatively large. Further, the semiconductor memory element 71 and the control circuit element 72 are juxtaposed in a direction in which the IC card 10 of the recording/reproducing apparatus and the data-processing apparatus or the like, is inserted into the apparatus, and the recording-error preventing mechanism 24 is so arranged that the switch member 24a moves parallel to the direction of inserting the IC card into the apparatus. Hence, the semiconductor memory element 71 can be proportionally large to acquire a great storage capacity.

The IC card 10 of this invention further has a card-identifying recess 25 in the bottom 11e of the card body 11. This recess 25 is provided to help the user to know that the IC card 10 is one for storing audio data, not an IC card for storing image data or an IC card for storing data of any other type, such as computer-processed data. That is, the card-identifying recess 25 helps to distinguish the audio-data IC card 10 with a copyright-protecting element, from IC cards of any other types.

Figure 10:
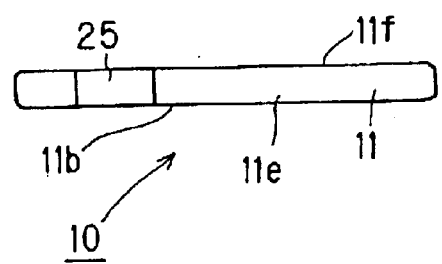
FIG. 10 is a rear view of the IC card.

As FIGS. 4, 6 and 10 illustrate, the card-identifying recess 25 is cut in the rear edge 11e of the card body 11. It is positioned between the side 11c of the card body 11, at which the chamfered section 18 is provided, and the center line $P_0$ of the IC card 10, which extends at right angles to the card insertion direction. The recess 25 extends, in the thickness direction of the card 10, from the bottom 11b to the top 11f of the card body 11. In view of this, the recess 25 differs from the other recesses, i.e., trenches 14, recess 19, insertion-error preventing groove 21, recess 22 and recess 23, which open at the bottom 11b of the card body 11 and closed at the top 11f thereof.

The top 11f and/or bottom 11b of the card body 11 has a label region (not shown), to which a label is bonded. Printed on the label are the type of the IC card 10, the description of the data recorded in the IC card 10 and the like.

It will be described how to inserted the IC card 10 according to the invention, into the recording/reproducing apparatus 1 and to set the IC card 10 in position in the apparatus 1.

The IC card 10 according to this invention is inserted into the recording/reproducing apparatus 1 through the IC card slot 2, first at its distal end, i.e., the front edge 11a having the terminal section 12, and with the top 11f turned up, as is illustrated in FIG. 1.

At the time of inserting the IC card 10, the user can easily know that the IC card 10 is one dedicated to the recording of audio data, as he or she holds the IC card 10. This is because the finger is placed in the card-idenitifying recess 25 that is cut in the rear edge 11e of the card body 11.

As described earlier, the card body 11 of the IC card 10 has the chamfered section 18 and trenches 14 at the front edge 11a. The user can therefore easily determine, by the touch, the orientation of the IC card 10 being inserted into the recording/reproducing apparatus 1. Further, once the user detects the card-identifying recess 25 cut in the rear edge 11e of the card body 11, he or she can know that the front edge 11a, opposite to the rear edge 11e, should be first inserted into the IC card slot 2.

The top 11f of the card body 11 is flat and smooth, having no recesses at all. By contrast, the bottom 11b of the card body 11 is not smooth, having the trenches 14, recess 19, insertion-error preventing groove 21 and recesses 22 and 23. This enables the user to tell, by the tough, which surface of the card body 11 is the bottom 11b or the top 11f.

When the IC card 10 is inserted in the correct position into the recording/reproducing apparatus 1 through the IC card slot 2, the insertion-error preventing projection provided in the apparatus 1 fits into the insertion-error preventing groove 21. At the same time, the card-holding strip that is an elastic member provided in the card-holding section of the apparatus 1 slips into the recess 22 made in the bottom 11b of the card body 11. As a result of this, the IC card 10 is firmly and steadily held in the recording/reproducing apparatus 1. Once the IC card 10 is so held in the apparatus 1, the card-holding strip fits into the recess 22 after sliding on the side 11c of the card body 11, while guided by the projection 20. The terminals of the apparatus 1 enter the trenches 14 cut at the front edge 11a of the card body 11, contacting the electrodes 15 lying in the trenches 14. Data can now be transferred between the recording/reproducing apparatus 1 and the IC card 10.

The user may holds the IC card 10 in the wrong position, for example, upside down, and may try to insert the IC card 10 into the recording/reproducing apparatus 1. If this is the case, the insertion-error preventing projection provided in the apparatus 1 abuts on the front edge 11a of the card body 11, which has the chamfered section 18, recess 19 and insertion-error preventing groove 21. This prevents the IC card 10 from being forced into the card-holding section of the apparatus 1. The user may insert the IC card 10 into the IC card slot 2 at the read edge 11e of the card body 11. If so, the insertion-error preventing projection contacts the rear edge 11e of the card body 11, preventing the IC card 10 from entering the card-holding section of the apparatus 1.

The IC card 10 placed in the card-holding section is ejected from the recording/reproducing apparatus 1 through the IC card slot 2 by means of the card-ejecting mechanism. At this time, the card-ejecting mechanism, which is incorporated in the card-holding section, has its tip set in the recess 23 of the IC card body 11.

As pointed out above, the IC card according to the present invention has the card-identifying recess 25 cut in the rear edge 11e of the card body 11. The recess 25 enables the user to determine, by the touch, whether the IC card 10 is an IC card for recording audio data only or a general-purpose IC card. It also enables the user to determine whether the IC card 10 can pass through the IC card slot 2 of the apparatus 1. Jointly with the trenches 14, recess 19, insertion-error preventing groove 21, recess 22 or recess 23, which is closed at the top 11f and opened at the bottom 11b and sides 11c and 11d, the card-identifying recess 25 can help the user not only to determine the type and orientation of the IC card 10, but also to distinguish the bottom 11b from the top 11f. Thus, visually handicapped persons can tell, by touching the IC card, the type and orientation of the IC card 10 and can distanguish which surface of the IC card 10 is the top or the bottom.

The card-identifying recess 25 enables the user to distinguish the IC card 10 for recording audio data only, from the standard-size IC cards. The card-identifying recess 25 can also help the user to know the storage capacity of the semiconductor memory element 71 contained in the card body 11. The trenches and recesses, each closed at the top 11f of the card body 11 and opened at the bottom 11b and sides 11c and 11d thereof, enable to the user to recognize the function of the IC card 10, either singly or in combination.

The IC card 10 described above is one used as an external storage device. Nonetheless, the IC card 10 may be one that functions not only as a memory device, but also as fingerprint-verifying device. Alternatively, the IC card 10 may be one that performs any function other than data-storing function.

The IC card 10 according to the invention can be used as a data-recording medium not only in the recording/reproducing apparatus 1 described above, but also in data-processing apparatuses such as personal computers, mobile radio terminal devices and portable terminal devices.

Another type of an IC card, according to the present invention, will be described.

The IC card 10 described above is small and may be difficult for some users to hold steadily enough to insert and remove it into and from the recording/reproducing apparatus.

Figure 11:
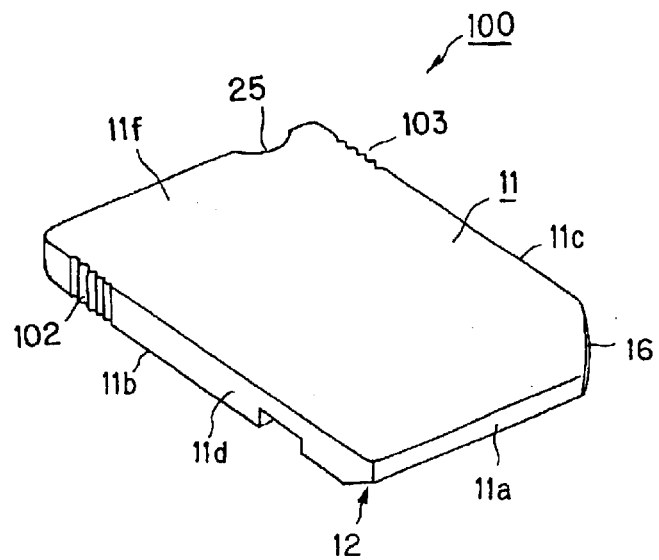
FIG. 11 is a perspective view of another IC card according to the present invention.
Figure 12:
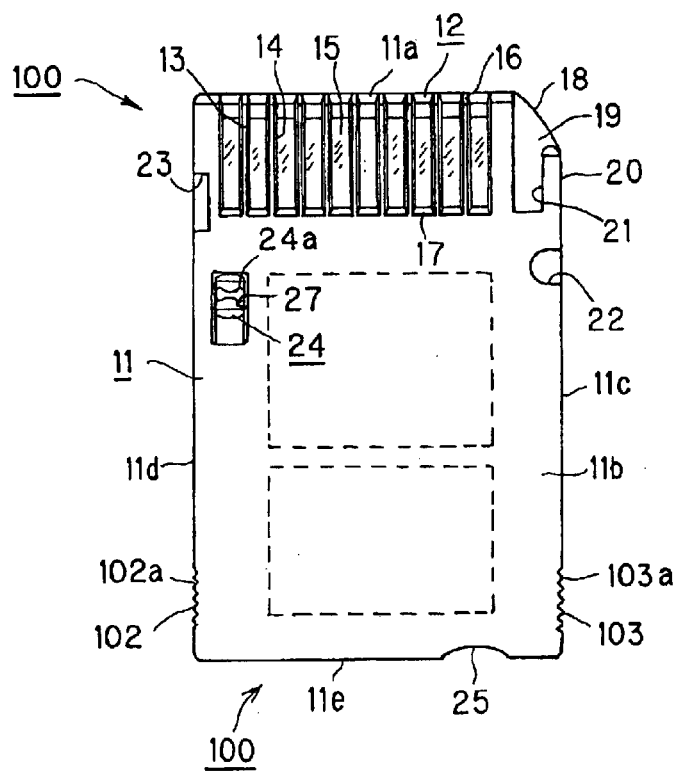
FIG. 12 is a bottom view of this IC card.

The IC card 100 of the other type is small, too. However, it has finger rests 102 and 103 provided on the opposing sides 11c and 11d, respectively. As FIGS. 11 and 12 show, the finger rests 102 and 103 are adjacent to the rear edge 11e, remote from the front edge 11a where the terminal section 12 is provided. The finger rest 102 has parallel grooves 102a, and the finger rest 103 parallel grooves 103a. The grooves 102a and 103a extend in the thickness direction of the card body 11. Alternatively, the finger rests 102 and 103 may have small pits each, thus having a rough surface each.

Due to the finger rests 102 and 103 provided on the opposing sides of the card body 11, the user can hold the IC card 10 steadily, with his or her fingers on the finger rests 102 and 103. The user can therefore reliably insert and remove the IC card 10 into and from the recording/reproducing apparatus 1.

The finger rests 102 and 103 may be provided on only one of the opposing sides 11c and 11d of the card body 11.

The IC card 10 is similar in structure to the IC card 10 described above, though having the finger rests 102 and 103. The components identical to those of the IC card 10 are therefore designated at the same reference numerals and will not be described in detail.

As seen from FIG. 4, the IC card 10 according to this invention is a small rectangular plate, having a width W of about 20.00 mm and a length L of about 31 mm. The IC card 10 has the recording-error preventing mechanism 24 in the bottom 11b of the card body 11, which has a small area. The recording-error preventing mechanism 24 provided in the small bottom 11b is small, too. The mechanism 24 must be small if the spaces accommodating the semiconductor memory element 71 and the control circuit 72 are large, particularly if the space for the semiconductor memory element 71 is large. If the recording-error preventing mechanism 24 is small for this reason, its switch member 24a should be proportionally small. If the switch member 24a is too small, it will be difficult for the user to operate it with the finger. The switch member 24a will be difficult to operate, particularly if it is positioned in the opening 27 made in the bottom 11b of the card body 11 as in the IC card 10 described above.

Another type of an IC card 120 according to the invention will be described, which is designed to solve the above-mentioned problem. That is, the IC card 120 is so configured that its recording-error preventing mechanism 24 is small and the switch member 24a of the mechanism, which is small, too, can yet be easy to operate.

Figure 13:
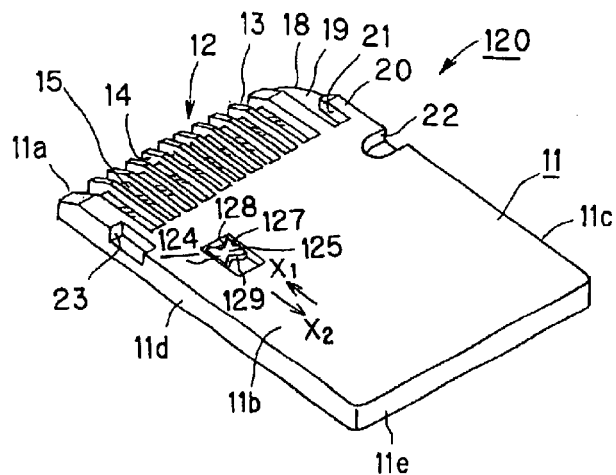
FIG. 13 is a perspective view of still another IC card according to the invention.

In the IC card 120 according to the present embodiment, the recording-error preventing mechanism 124 is provided in the bottom 11b of the card body 11 and located between the side 11d of the card body 11 and the control circuit element 72 contained in the card body 11, as is illustrated in FIG. 13. In this respect the IC card 120 is similar to the IC card 10 described above. The recording-error preventing mechanism 124 has a switch member 125 that is exposed in the opening 127 cut in the bottom 11b of the card body 11. The switch member 125 can be moved in opposite directions of arrows $X_1$ and $X_2$, both being parallel to the direction in which the IC card 10 may be inserted into the apparatus 1. In this recording-error preventing mechanism 124, too, the switch member 125 switches the operating state of the IC card 10, between the recording state and the non-recording state, when it is moved. For example, when moved in the direction of arrow $X_1$, the switch member 125 sets the IC card 120 into the recording state, making it possible to store data into the semiconductor memory element 71. When moved in the direction of arrow $X_2$, the switch member 125 sets the IC card into the non-recording state, preventing the recording of any data into the element 71.

The switching member 125 of the recording-error preventing mechanism 124 is set at such a level that it would not protrude from the bottom 11b of the card body 11 through the opening 127. Thus, the IC card 10 can be smoothly inserted into, and removed from, the recording/reproducing apparatus 1.

The switch member 125 has notches 128 and 129 in the ends that oppose in the direction of moving the switch member 125. A jig for moving the switch member 125 can be set into the notches 128 and 129.

The jig for moving the switch member 125 may be a writing instrument or a pin made of metal, either having a pointed tip.

Figure 14:
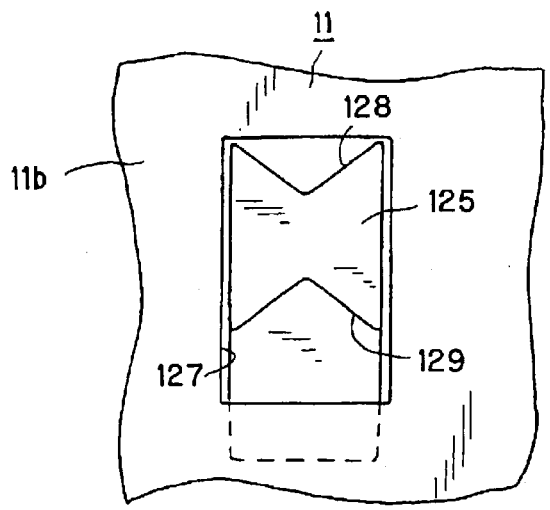
FIG. 14 is a plan view depicting the switching member of a recording-error preventing mechanism.

As FIGS. 13 and 14 show, the notches 128 and 129 of the switch member 125 are triangular ones cut in the ends of the member 125, which oppose in the direction of moving the switch member 125. The notches 128 and 129 define a space each, even when the member 125 abuts on an edge of the opening 127. Into that space the tip of the jig can be inserted. Hence, the user can easily move the switch member 125, using the jig.

Figure 15:
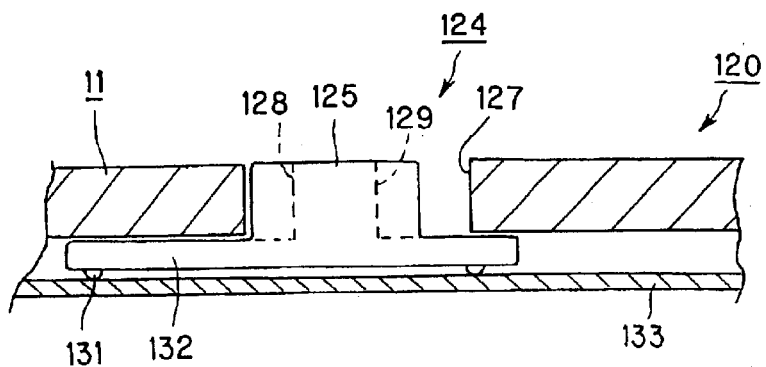
FIG. 15 is sectional view of the recording-error preventing mechanism.

When the switch member 125 of the recording-error preventing mechanism 124 is moved, as shown in FIG. 15, the switch contact section 132 having a contact 131 that is formed integral with the member 125 moves the printed circuit board 133 arranged in the card body 11. A switch (not shown) mounted on the printed circuit board 133 is thereby operated to switch the operating state of the IC card 120, between the recording state and the non-recording state.

When the recording-error preventing mechanism 124 is thus operated, the data representing the operating-sate is generated. The data is supplied to the control circuit element 72 incorporated in the card body 11. The control circuit 71 determines whether data can be recorded into the semiconductor memory element 71, in accordance with the data indicating the operating-state.

The embodiments described above are small IC cards according to the present invention. Nevertheless, the present invention can be applied to not only small IC cards, but also to standard-size IC cards. The standard-size IC cards according to the invention can achieve the same advantages as the small IC cards described above.

The small IC cards according to the invention cannot be held in apparatuses which can hold only standard-size IC cards, such as audio-data recording/reproducing apparatuses, personal computers, digital still cameras and digital video cameras, though they have the same basic structures as the standard-size IC cards.

Accordingly, the present invention aims at providing an IC-card adapter apparatus that can make it possible to hold small IC cards in the apparatuses designed to hold standard-size IC cards only.

Figure 16:
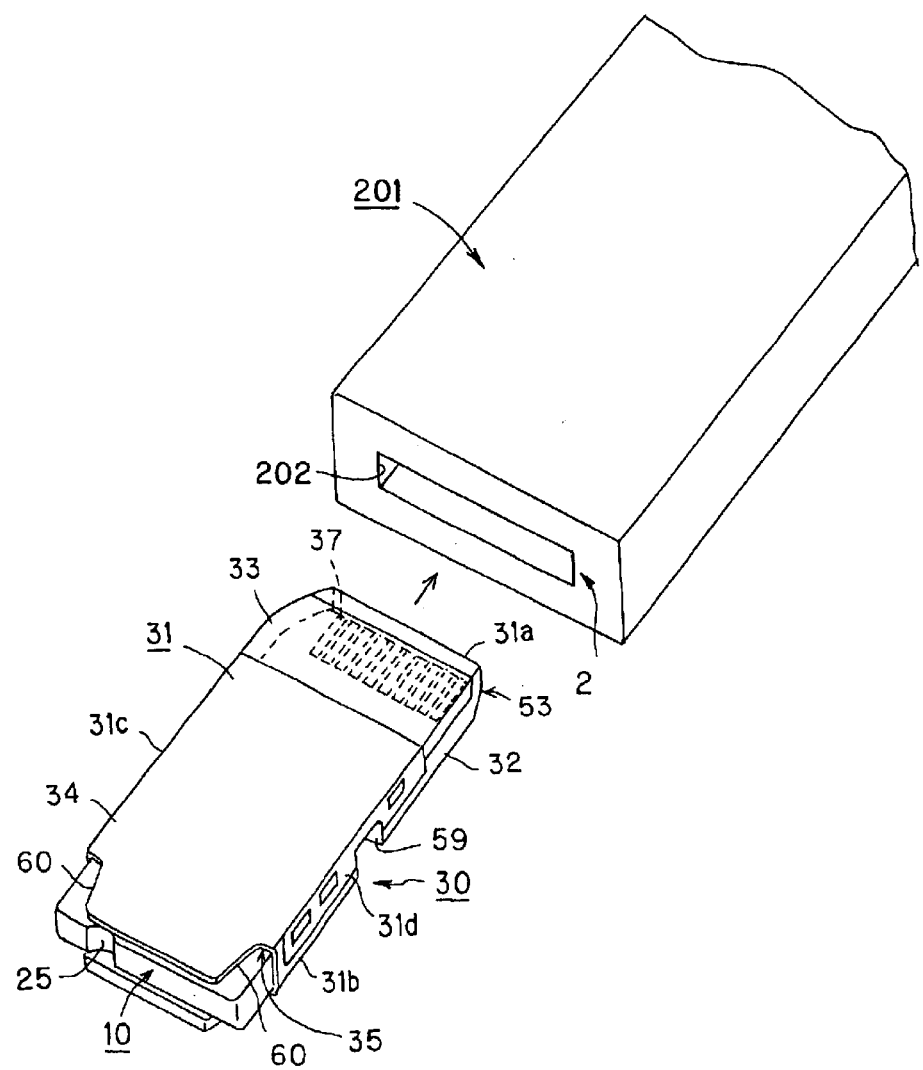
FIG. 16 is a perspective view illustrating an adapter apparatus of this invention, which is being inserted into a recording/reproducing apparatus.

An IC-card adapter apparatus 30 according to the invention is configured to hold small IC cards in the apparatuses that are designed to hold only standard-size IC cards. As FIG. 16 shows, the IC-card adapter apparatus 30 can be inserted into the card-holding section of a host apparatus 201 through the IC card slot 202 made in one end of the host apparatus 201. The IC-card adapter apparatus 30 can hold a small IC card 10 of the type shown in FIGS. 2 to 7. The small IC card 10 incorporates a semiconductor memory that can be used as an external storage device for the host apparatus 201. The IC-card adapter apparatus 30 has substantially the same size as standard-size IC cards. Assume that the adapter 30 holds a small IC card 10. Then, the small IC card 10 will be held in the host apparatus 201 by inserting the adapter apparatus 30 into the card-holding section through the IC card slot 202 of the host apparatus 201.

Figure 17:
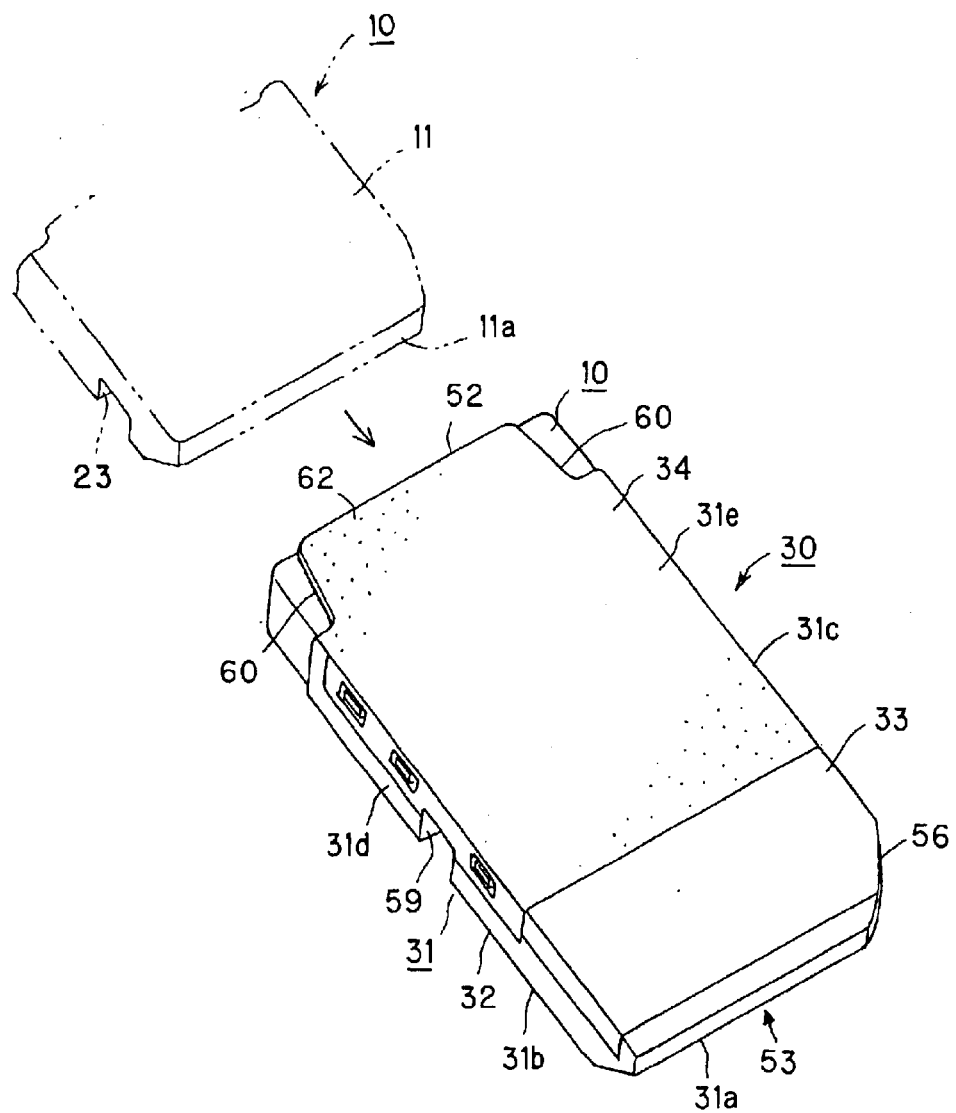
FIG. 17 is a perspective view of the adapter apparatus holding an IC card, viewed from above.
Figure 18:
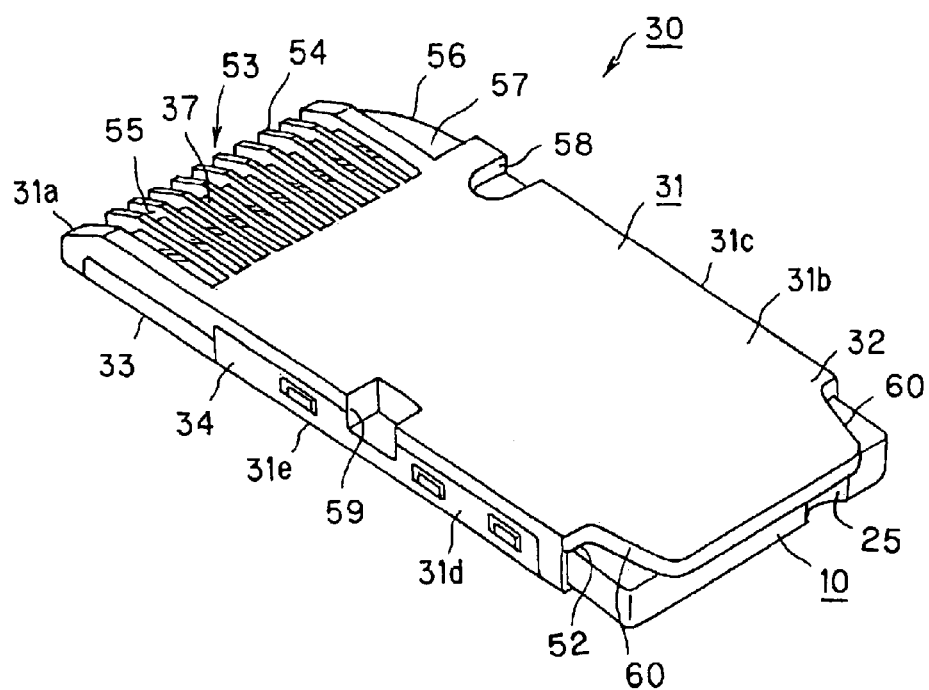
FIG. 18 is a perspective view of the adapter apparatus holding an IC card, viewed from under.

As FIGS. 17 and 18 illustrate, the adapter apparatus 30 has a housing 31. The housing 31 can hold an IC card 10.

The housing 31 is almost identical to the standard-size IC card in shape and size. The housing 31 comprises a lower case 32, an upper case 33, and a cover 34. The lower case 32 has substantially the same size as the standard IC card. The upper case 33 is secured to the lower case 32. The cover 34 is secured to the lower case 32, too, to hold the small IC card 10. The housing 31 incorporates a card-holding section 35 that is configured to hold the IC card 10.

Figure 19:
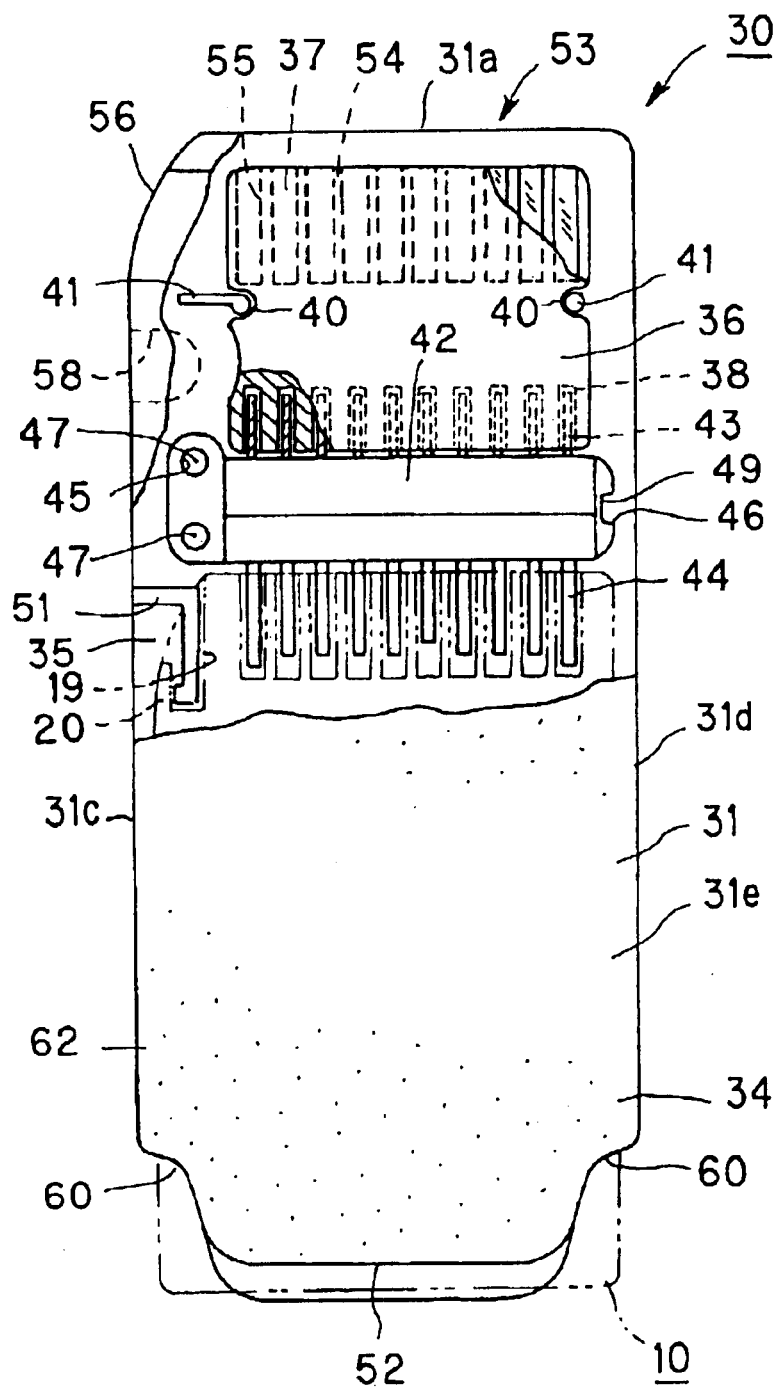
FIG. 19 is a partly sectional, plan view of the adapter apparatus, showing the internal structure of the adapter apparatus.

The lower case 32 is made of synthetic resin, formed by injection molding to a size almost equal to that of conventional IC cards. As FIG. 19 shows, the lower case 32 has a relay board 36 located at the front edge 31a of the housing 31. The relay board 36 is substantially rectangular. The first contacts 37 are provided in the same number as the electrodes 15 of the IC card 10, on one long side of the relay board 36, i.e., the front edge 31a of the housing 31. More correctly, ten first contacts are arranged in a row. The first contacts will contact the terminals provided in the card-holding section of the host apparatus 1 when the adapter apparatus 30 is inserted into the card-holding section. Further, second contacts 38 are provided on the relay board 36, near the other long side thereof, in the same number as the first contacts 37. Terminals are soldered to the second contacts 38. These terminals will be electrically connected to the electrodes 15 of the IC card 10 when the adapter apparatus 30 is inserted into the card-holding section. The relay board 36 has two positioning notches 40, one in each short side. Two positioning projections 41 protrude from the lower case 32. The substrate 36 is secured to the lower case 32 and positioned with respect to the case 32, with the projections 41 set in the notches 40.

A terminal plate 42 is provided adjacent to the relay board 36 and attached to the lower case 32, for electrically connecting the relay board 36 to the terminal section 12 of the IC card 10 held in the card-holding section 35. The terminal plate 42 is made of conductive material such as metal and is substantially rectangular as a whole. On the plate 42, terminals 43 are arranged on the relay board side in the same number as the first contacts 37 and the second contacts 38. The terminals 43 are electrically connected to the second contacts 38 provided on the relay board 36, by means of soldering or the like. On the terminal plate 42, connection contacts 44 are provided in the same number as the electrodes 15 of the IC card 10. The connection contacts 44 will abut on the electrodes 15 when the IC card 10 is inserted into the card-holding section 35. The connection contacts 44 are elastic strips that extend toward the card-holding section 35. They will push the electrodes 15 of the IC card 10 when the IC card 10 is inserted into the card-holding section 35. Thus, they hold the IC card 10 in place in the card-holding section 35 and are electrically connected to the electrodes 15.

The terminal plate 42 has two positioning holes 45 made in one short side and a positioning notch 46 cut in the other short side. As FIG. 19 shows, two positioning projections 47 protrude from the lower case 32, and so does another positioning projection 49. The projections 47 pass through the positioning holes 45 of the terminal plate 42. The positioning projection 49 is set in the positioning notch 46 of the terminal plate 42. The positioning projections 47 and 49 are subjected to, for example, ultrasonic fusing, whereby the relay board 36 is secured to the lower case 32 at a desired position with respect to the lower case 32, extending parallel to the short sides of the lower case 32.

The card-holding section 35 for holding the IC card 10 is provided on the lower case 32 and located adjacent to the terminal plate 42. The card-holding section 35 has an insertion-error preventing projection 51 that is configured to prevent the IC card 10 from being inserted in a wrong position. When the IC card 10 is inserted in the correct position, the insertion-error preventing projection 51 slips into the insertion-error preventing groove 21 provided at the front edge 11a of the IC card 10. When the IC card 10 is inserted in a wrong position, for example, with the bottom 11b turned up, the projection 51 abuts on the front edge 11a of the IC card 10, not slipping into the insertion-error preventing groove 19. In this case, the insertion-error preventing projection 51 prevents the IC card 10 from entering the card-holding section 35.

After the relay board 36, the terminal plate 42 and the like have been secured to the front half of the lower case 32 and at prescribed positions, the upper case 33 is secured to the lower case 32 by means of ultrasonic fusing or the like. When secured to the lower case 32, the upper case 33 constitutes, jointly with the lower case 32, a component-holding section. The cover 34 is then secured to the lower case 32, in alignment with the upper case 33. When so secured to the lower case 32, the cover 34 constitutes, together with the lower case 32, the card-holding section 35 for holding the IC card 10. The housing 31, thus made, has an IC card slot 52, through which the IC card 10 can be inserted into the card-holding section 35, at the rear opposite to the front edge 31a.

As FIGS. 18 and 19 show, a terminal section 53 lies in the housing 31 comprising the lower case 32 and the upper case 33 and cover 34 that are secured to the lower case 32 as described above. The terminal section 53 enables the adapter apparatus 30 to supply and receive data to and from the host apparatus 1. The terminal section 53 has a plurality of partitions 54 that isolate the first contacts 37 provided on the relay board 36. The partitions 54 have an engagement groove 55 each. The grooves 55 open at the front edge 31a and bottom 31b of the housing 31. The grooves 55 can therefore receive the terminals arranged in the card-holding section of the host apparatus 1. The first contacts 37 lie on the bottoms of the respective engagement grooves 55. They are isolated from one another by the partitions 54. Lying on the bottoms of the grooves 55, the first contacts 37 would not contact the user's fingers; they are thus protected.

The housing 31 has a chamfered section 56 at one corner of the front edge 31a where the terminal section 53 is provided. The section 56 helps the user to determine easily the orientation of the adapter apparatus 30 and, ultimately, enables the user to insert the adapter apparatus 30 into the host apparatus 1 in the correct position. The housing 31 has a recess 57 in the bottom 31b and near the chamfered section 56. The recess opens at the front edge 31a and the side 31c where the chamfered section 56 is provided. The recess 57 functions as an insertion-error preventing groove to prevent the adapter apparatus 30 from being inserted in a wrong position into the host apparatus 1. The recess 57 receives the error-insertion preventing projection provided in the card-holding section of the apparatus 1, only when the adapter apparatus 30 is inserted in the correct position into the host apparatus 1. When the adapter apparatus 30 is inserted in a wrong position, for example, with the bottom 31b turned up, the error-insertion preventing projection abuts on the front edge 31a of the housing 31. In this case, the adapter apparatus 30 cannot enter the card-holding section of the host apparatus 1; the terminals arranged in the card-holding section do not enter the engagement grooves 55 and would not damage the first contacts 37 that lie in the grooves 55.

The housing 31 has a groove 58 in the bottom 31b and located near the chamfered section 56. The groove 58 is provided to prevent the IC card 10 from slipping out of the card-holding section of the host apparatus. This recess 58 opens at the bottom 31b and the side 31c. Note that the side 31c is parallel to the direction in which the IC card 10 is inserted into the host apparatus. The recess 58 receives a card-holding strip provided in the card-holding section of the host apparatus 1, only when the IC card 10 is inserted in the correct position into the host apparatus 1.

The housing 31 has a recess 59 in the bottom 31b, opening at the side 31d that is opposite to the side 31c and located at the middle part of the side 31d. The recess 59 may receive the tip of the card-ejecting mechanism that is incorporated in the card-holding section of the host apparatus 1, thereby to eject the IC card 10 from the card-holding section. The recess 59 allows the card-ejecting mechanism to eject the IC card 10 only if the IC card 10 has been inserted in the correct position into the host apparatus 1. This is because the recess 59 opens at the bottom 31b and the side 31d extending parallel to the direction in which the IC card 10 is inserted into the host apparatus 1.

The card-holding section 35 is as large as to accommodate the entire IC card 10. The lower case 32 and cover 34, which define the IC card slot 52 for guiding the IC card 10 being inserted and removed into and from the card-holding section 35, have notches 60 at the corners of their proximal ends. The rear-edge corners of the IC card 10 held in the section 35 are exposed through notches 60. The user can hold the rear-edge corners thus exposed, to pull the IC card 10 out of the adapter apparatus 30. The housing 30 may have only one notch 60 at one rear-edge corner.

Figure 20:
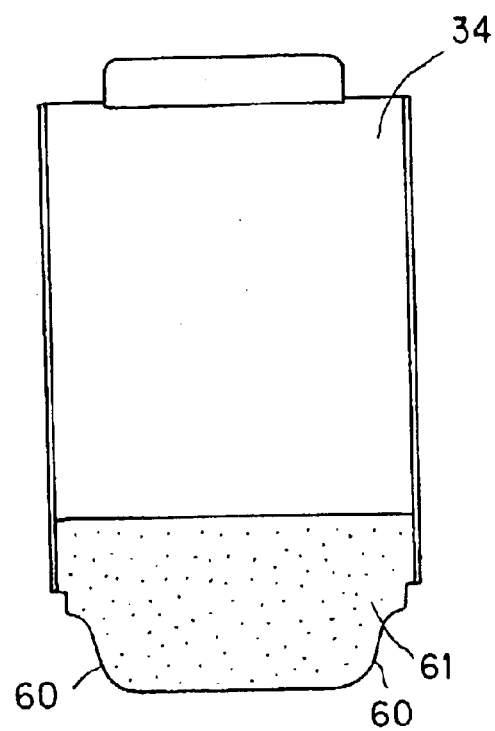
FIG. 20 is a plan view of the cover at the distal end of the adapter apparatus, as viewed from the back of the adapter apparatus.
Figure 21:
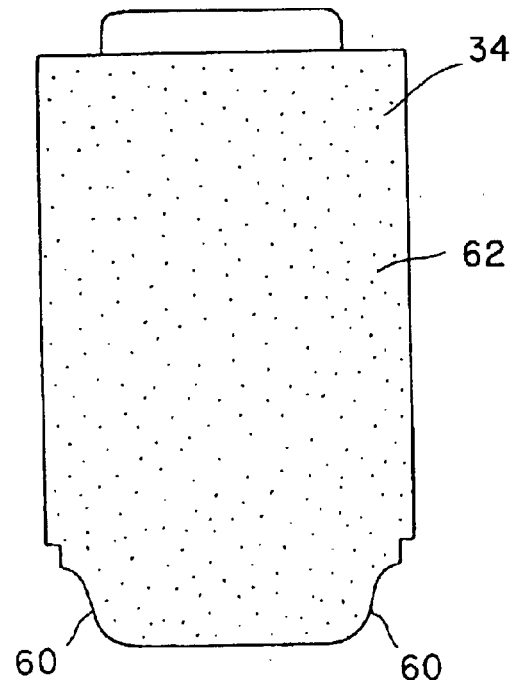
FIG. 21 is a plan view of the cover of the adapter apparatus, as viewed from the front of the adapter apparatus.

The cover 34 constituting the card-holding section 35 is a metal plate. The cover 34 may contact the IC card 10, possibly damaging the same, while the IC card 10 is being inserted into or removed from the adapter apparatus 30. To avoid such damage to the IC card 10, the cover 34 has a protective coating, or a fluoride coating 61, at least on the reverse-side part near the IC card slot 52, as is illustrated in FIG. 20. As FIG. 21 depicts, a fluoride coating 62 is provided on the entire obverse side of the cover 34. Since that part of the cover 34 in which the IC card slot 52 is cut is coated with the fluoride coatings 61 and 62, the user has no risk of having the finger injured. It is sufficient for the cover 34 to have a fluoride coating 62 at the part having the IC card slot 52. Whether the fluoride coating 62 should be applied to any other part depends upon the structural specification of the host apparatus.

How to insert and remove the IC card 10 into and from the adapter apparatus 30 will be explained. As FIGS. 17 and 18 show, the IC card 10 is inserted into the IC card slot 52, with the top 11f turned up, first at the front edge 11a on which the terminal section 12 is provided. When the IC card 10 is inserted in the correct position into the adapter apparatus 30, the insertion-error preventing projection 51 fits into the insertion-error preventing groove 19. At the same time, the connection contacts 44 enter the grooves 55 of the terminal section 53 and contact the first contacts 37. The IC card 10 is thereby electrically connected to the adapter apparatus 30. In other words, the relay board 36 and terminal plate 42 electrically connect the electrodes 15 of the IC card 10 to the first contacts 37 of the adapter apparatus 30. If inserted in the correct position, the IC card 10 is held in its entirety within the card-holding section 35 of the adapter apparatus 30. The adapter apparatus 30 thus holding the IC card 10 may be inserted into the host apparatus 1, whereby the IC card 10 is connected to the host apparatus 1 though it is smaller than standard-size IC cards.

When the IC card 10 is inserted in a wrong position into the IC card slot 52, for example, with the bottom 11b turned up or turned around by 180 the insertion-error preventing projection 51 provided in the card-holding section 35 abuts on the front edge 31a or rear edge of the housing 31. Hence, the IC card 10 cannot be held in the card-holding section 35. The IC card 10 would not enter the card-holding section 35, with its rear part protruding from the IC card slot 52. From this condition the user can determine that he or she has inserted the IC card 10 in a wrong position.

The user may hold the IC card 10 inserted in the card-holding section 35 at the rear-edge corners protruding from the IC card slot 52, with the thumb and the finger placed in the notches 60. Thus, the user can pull the IC card 10 out of the card-holding section 35 of the adapter apparatus 30. While the IC card 10 is removed from the section 35, it is not damaged because the fluoride coating 61 is provided on the reverse side of the IC card 10.

How to insert and remove the adapter apparatus 30 into and from the host apparatus 1, will be explained with reference to FIGS. 16 and 19. Assume that the user inserts the adapter apparatus 30 into the host apparatus 1 through the IC slot 2. If the adapter apparatus 30 is inserted in the correct position, with its front edge 31a inserted first and its top 31e turned up, the insertion-error preventing projection provided in the adapter-holding section of the host apparatus 1 fits into the insertion-error preventing groove, i.e., the recess 57. At the same time, the card-holding strip that is an elastic member provided in the apparatus 1 slips into the groove 58. Further, the terminals provided in the card-holding section of the host apparatus 1 abut on the first contacts 37 of the terminal section 53, whereby data can be transferred between the host apparatus 1 and the IC card 10 electrically connected to the adapter apparatus 30.

The chamfered section 56 is provided at the front edge 31a of the housing 31, which should first enter the host apparatus 1 when the adapter apparatus 30 is inserted into the host apparatus 1. Touching the chamfered section 56, the user can easily know the orientation of the adapter apparatus 30. No recesses are made in the top 31e of the adapter apparatus 30, whereas the engagement groove 55, recess 57, groove 58 and recess 59 are made in the bottom 31b of the adapter apparatus 30. This also helps the user to understand, by touching the apparatus 30, which side of the apparatus 30 is the top or the bottom, and can therefore insert the apparatus 30 in the correct position into the host apparatus 1.

If the adapter apparatus 30 is inserted in a wrong position into the host apparatus 1, the insertion-error preventing projection 51 provided in the card-holding section of the host apparatus 1 abuts on the front edge 31a or rear edge of the housing 31 and the adapter apparatus cannot be inserted further into the host apparatus 1. Then, the user knows that the IC card 10 has been inserted in a wrong position.

The adapter apparatus 30 can be ejected from the host apparatus 1 through the IC slot 2 by the eject mechanism that is set in engagement with the recess 59 made in the bottom 31b of the housing 31.

The IC card 10 is inserted into the adapter apparatus 30 described above and the adapter apparatus 30 is inserted into the host apparatus 1, in the same orientation as the existing IC cards are inserted into the host apparatus 1. Hence, it is easy for the user to learn in which orientation he or she has to hold the IC card 10 and the apparatus 30 at the time of inserting the IC card 10 and the adapter apparatus 30. In addition, the IC card 10 can be prevented from being inserted, in a wrong position, into the adapter apparatus 30 since the card-holding section 35 has the insertion-error preventing projection 51 that can fit into the insertion-error preventing groove 21. Thus, the user can easily know that the IC card 10 has been inserted in a wrong position into the adapter apparatus 30, because the IC card 10 remains protruding from the IC card slot 52. After the IC card 10 has been held in its entirely in the card-holding section 35, the IC card 10 is housed in its entirely in the adapter apparatus 30. Nonetheless, the user can easily pull the IC card 10 from the card-holding section 35, because he or she can hold the IC card 10 by virtue of the notches 60 that lie near the IC card slot 52. Additionally, the cover 34 of the card-holding section 35 has a fluoride coating 61 on the reverse side. The coating 61 protects the IC card 10 from damages as the IC card 10 is repeatedly inserted and removed into and from the adapter apparatus 30.

The IC card 10, which is used as an external storage device, has been described. Nevertheless, the IC card 10 may be one that functions not only as a memory device, but also as fingerprint-verifying device. Alternatively, the IC card 10 may be one that performs only a function other than data-storing function.

Industrial Applicability

The IC card according to the present invention has an identification notch in the proximal end opposite to the distal end. The user can therefore tell, by touching the IC card, what kind of a card the IC card is and which end is the distal end that should be first inserted into the host apparatus. If the user touches the identification notch that closes at the top of the card body and the recesses, each opening at the bottom and one side of the card body, he or she can determine the type, orientation and position (which side is top or bottom) of the IC card even in the dark. Thus, visually handicapped persons can easily identify the IC card and 10 and can tell which side of the card is top or bottom.

Moreover, the IC card according to the present invention is small and yet has a large space to accommodate a semiconductor memory, because the recording-error preventing mechanism is provided in the bottom of the card body and located at a specific position. Hence, it can not only have a great storage capacity, but also reliably operate owing to the recording-error preventing mechanism.

The IC-card adapter apparatus according to this invention holds a whole IC card once the IC card has been inserted into the card-holding section. Nonetheless, the rear edge of the IC card is exposed through the notches made near the IC card slot of the IC-card adapter apparatus. The user can therefore pull the IC card from the adapter apparatus, holding the rear edge of the IC card.

What is claimed is:

1. An IC card, comprising:
   a substantially rectangular card body incorporating at least a semiconductor memory;
   a terminal section provided at distal end of the card body and configured to be electrically connected to a host apparatus; and
   an identification recess formed in a fixed position in a proximal end of the card body opposite to the distal end, the proximal end defining an edge, the identification recess having first and second ends positioned on the edge.

2. The IC card according to claim 1, wherein the card body has a center line extending in an insertion direction of the IC card into the host apparatus and defining first and second sides of the card body, the identification recess being formed toward the first side of the card body from the center line.

3. The IC card according to claim 1, wherein the terminal section has a recess which opens the distal end and a bottom of the card body and a plurality of electrodes lying on a bottom of the recess.

4. The IC card according to claim 3, further comprising a plurality of partitions for isolating the electrodes from one another, wherein the electrodes extend parallel to an insertion direction of the IC card into the host apparatus.

5. The IC card according to claim 1, wherein the card body has a chamfered section provided at a corner of the distal end for enabling a user to determine an insertion direction of the IC card into the host apparatus.

6. The IC card according to claim 5, wherein the card body has a center line extending in the insertion direction, the identification recess being formed toward a first side of the card body from the center line, and the corner at which the chamfered section is provided being located on the first side of the card body.

7. The IC card according to claim 1, further comprising an insertion-error preventing groove formed in a bottom of the card body and at one corner of the distal end.

8. The IC card according to claim 7, wherein the card body has a center line extending in an insertion direction of the IC card into the host apparatus, the identification recess being formed toward a first side of the card body from the center line, and the one corner of the distal end at which the insertion-error preventing groove is formed being located on the first side of the card body.

9. The IC card according to claim 2, further comprising a recess for preventing the IC card from slipping out of the host apparatus, the recess being positioned on the first side of the card body.

10. The IC card according to claim 2, further comprising a recess in a bottom of the card body for achieving ejection of the IC card from the host apparatus, the recess being positioned on the second side of the card body.

11. The IC card according to claim 1, further comprising a finger rest in at least one side of the card body, the at least one side extending parallel to an insertion direction of the IC card into the host apparatus, the finger rest being positioned in a vicinity of the proximal end of the card body.

12. The IC card according to claim 11, wherein the finger rest has a rough surface provided on the at least one side of the card body.

13. The IC card according to claim 11, wherein the finger rest comprises a plurality of projections formed on the at least one side of the card body.

14. An IC card, comprising:
a substantially rectangular card body having a terminal section at a distal end thereof configured to be electrically connected to a host apparatus;
a semiconductor memory incorporated in the card body;
a control circuit incorporated in the card body for controlling the semiconductor memory; and
a recording-error preventing mechanism for controlling data-recording into the semiconductor memory,
wherein the IC card is insertable into the host apparatus in an insertion direction, the control circuit being located near the terminal section, the semiconductor memory and the control circuit being aligned relative to one another in the insertion direction, and the recording-error preventing mechanism being provided in a bottom of the card body in a position between the control circuit and one side of the card body, the recording-error preventing mechanism having a switch member movable in a direction parallel to the insertion direction.

15. The IC card according to claim 14, further comprising an identification recess formed in a proximal end of the card body opposite to the distal end.

16. The IC card according to claim 14, wherein the terminal section has a recess which opens the distal end and the bottom of the card body and a plurality of electrodes lying on a bottom of the recess.

17. The IC card according to claim 14, wherein the card body has a chamfered section provided at a corner of the distal end for enabling a user to determine an insertion direction of the IC card into the host apparatus.

18. The IC card according to claim 14, further comprising an insertion-error preventing groove formed in the bottom of the card body and at one corner of the distal end.

19. The IC card according to claim 15, further comprising a recess for preventing the IC card from slipping out of the host apparatus, wherein the card body has a center line extending in the insertion direction, the identification recess being formed toward a first side of the card body from the center line, and the recess being positioned on the first side of the card body.

20. The IC card according to claim 15, further comprising a recess in the bottom of the card body for achieving ejection of the IC card from the host apparatus, wherein the card body has a center line extending in the insertion direction and defining first and second sides of the card body, the identification recess being formed toward the first side of the card body from the center line, and the recess being positioned on the second side of the card body.

21. The IC card according to claim 14, further comprising a finger rest in at least one side of the card body, the at least one side extending parallel to the insertion direction, the finger rest being positioned in a vicinity of a proximal end of the card body opposite to the distal end.

22. An IC card, comprising:
a substantially rectangular card body having a terminal section at a distal end thereof configured to be electrically connected to a host apparatus;
a semiconductor memory incorporated in the card body; and
a recording-error preventing mechanism for controlling data-recording into the semiconductor memory, the recording-error preventing mechanism having a switch member slideable in an aperture in one surface of the card body, the switch member having first and second ends, a first notch formed in the first end and a second notch formed in the second end, the first and second notches being adapted to receive a jig for moving the switch member in the aperture,
wherein the switch member is moveable between a first position allowing data-writing into the semiconductor memory and a second position inhibiting data-writing into the semiconductor memory.

23. The IC card according to claim 22, wherein the switch member has a height so as not to protrude from the aperture.

24. The IC card according to claim 22, wherein each of the notches defines a space between the switch member and a periphery of the aperture for receiving the jig.

25. The IC card according to claim 22, wherein the switch member is movable in a direction parallel to an insertion direction of the IC card into the host apparatus.

26. The IC card according to claim 22, wherein the recording-error preventing mechanism is arranged between one side of the card body and a control circuit incorporated in the card body, the control circuit being operable to control the semiconductor memory.

27. An IC-card adapter apparatus, comprising:
a main body configured to be held in a host apparatus;
a card-holding section provided in the main body for holding an IC card having at least a semiconductor memory and a first terminal section at one end thereof, the card-holding section having a projection adapted to be received in a groove formed in one end of the IC card when the IC card is assembled in a correct position in the card-holding section;

a second terminal section provided at a distal end of the main body adapted for insertion into the host apparatus, the second terminal section being configured to transmit data to and receive data from the host apparatus;

an IC card slot formed in a proximal end of the main body opposite the distal end and in communication with the card-holding section;

a connecting section provided in the card-holding section, the connecting section being electrically connected to the second terminal section and adapted to be connected to the first terminal section of the IC card; and a notch formed in the proximal end of the main body, the notch exposing a part of an IC card held in the card-holding section.

28. The IC-card adapter apparatus according to claim 27, further comprising a relay board arranged in the main body, the relay board electrically connecting the second terminal section to the connection section.

29. The IC-card adapter apparatus according to claim 27, wherein the IC card slot is at least partly covered by a protective coating.

30. The IC-card adapter apparatus according to claim 27, wherein, when an IC card is inserted into the IC-card adapter apparatus, the IC-card adapter apparatus has a size substantially the same as a standard IC card.

31. The IC-card adapter apparatus according to claim 29, wherein the protective coating comprises a fluoride coating.

32. An IC card, comprising:

a substantially rectangular card body having a width of about 20 mm, a length of about 31 mm and a thickness of about 1.6 mm;

a semiconductor memory disposed in the card body;

a terminal section provided at a distal end of the card body and adapted to be electrically connected to a host apparatus; and an identification recess formed in a proximal end of the card body opposite to the distal end.

33. The IC card according to claim 32, wherein the card body has a center line extending in an insertion direction of the IC card into the host apparatus and defining first and second sides of the card body, the identification recess being formed toward the first side of the card body from the center line.

34. The IC card according to claim 32, wherein the terminal section has a recess which opens the distal end and a bottom of the card body and a plurality of electrodes disposed on a bottom of the recess.

35. The IC card according to claim 32, wherein the card body has a chamfered section provided at a corner of the distal end for enabling a user to determine an insertion direction of the IC card into the host apparatus.

36. The IC card according to claim 32, further comprising an insertion-error preventing groove formed in a bottom of the card body and at one corner of the distal end.

37. The IC card according to claim 33, further comprising a recess for preventing the IC card from slipping out of the host apparatus, the recess being positioned on the first side of the card body.

38. The IC card according to claim 33, further comprising a recess in a bottom of the card body for achieving ejection of the IC card from the host apparatus, the recess being positioned on the second side of the card body.

39. The IC card according to claim 32, further comprising a finger rest in at least one side of the card body, the at least one side extending parallel to an insertion direction of the IC card into the host apparatus, the finger rest being positioned in a vicinity of the proximal end of the card body.

* * * * *

UNITED STATES PATENT AND TRADEMARK OFFICE
CERTIFICATE OF CORRECTION

PATENT NO. : 6,768,645 B2
APPLICATION NO. : 10/239253
DATED : July 27, 2004
INVENTOR(S) : Akira Kadonaga It is certified that error appears in the above-identified patent and that said Letters Patent is hereby corrected as shown below:

On the cover page in the title, delete "ADAPTOR" and insert --ADAPTER APPARATUS--.
Column 2, line 22, replace "an" with --a--.
Column 2, line 32, "Use" should read --Used--.
Column 2, line 35, "help" should read --helps--.
Column 2, line 53, "boy" should read --body--.
Column 3, line 16, "boy" should read --body--.
Column 3, line 21, "having" should read --has--.
Column 3, line 28, after "member" insert --has--.
Column 3, line 35, "an" should read --a--.
Column 4, line 9, "of the provide" should read --provided--.
Column 4, line 30, "under" should read --below--.
Column 4, line 43, after "will" insert --be--.
Column 4, line 47, "reproduce" should read --reproduces--.
Column 5, line 3, after "usually" insert --would--.
Column 5, line 45, "as least" should read --at least--.
Column 5, line 52, "11b" should read --trenches 14--.
Column 7, line 39, "close" should read --closed--.
Column 8, line 10, "closed" should read --close--.
Column 8, line 15, "inserted" should read --insert--.
Column 8, line 43, "tough" should read --touch--.
Column 8, line 62, "holds" should read --hold--.
Column 9, line 29, "distinguish" should read --distinguish--.
Column 10, line 9, "The IC card 10 is similar" should read --The IC card 100 is similar--.
Column 16, line 12, "damages" should read --damage--.

UNITED STATES PATENT AND TRADEMARK OFFICE
CERTIFICATE OF CORRECTION

PATENT NO. : 6,768,645 B2
APPLICATION NO. : 10/239253
DATED : July 27, 2004
INVENTOR(S) : Akira Kadonaga It is certified that error appears in the above-identified patent and that said Letters Patent is hereby corrected as shown below:

Column 16, line 32, delete the first "and".
Column 16, line 52, after "at" insert --a--.

Signed and Sealed this

Seventeenth Day of October, 2006

JON W. DUDAS
*Director of the United States Patent and Trademark Office*